Patented July 7, 1925.

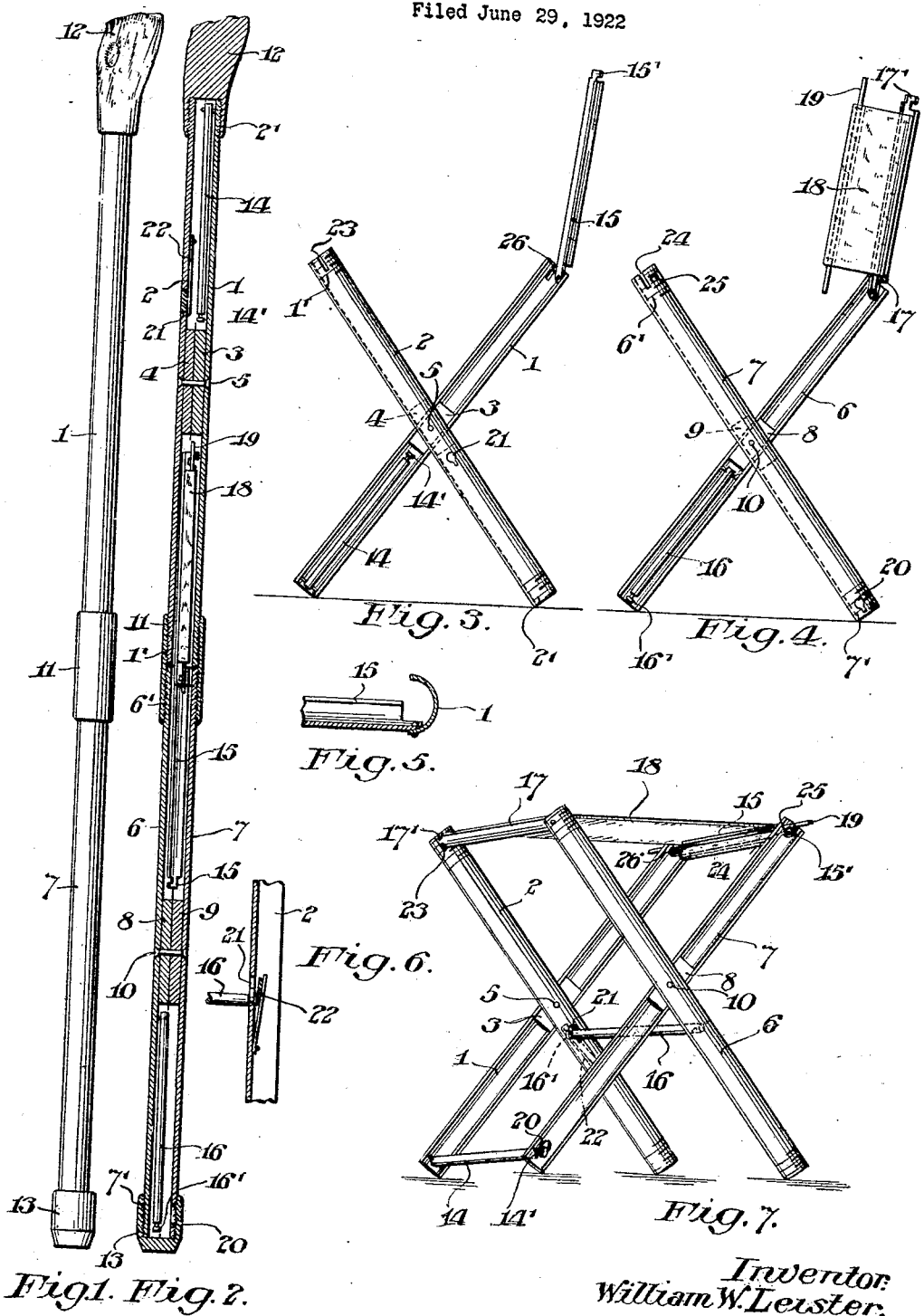

1,545,054

UNITED STATES PATENT OFFICE.

WILLIAM W. LEISTER, OF QUAKERTOWN BOROUGH, PENNSYLVANIA.

COMBINED CANE AND STOOL.

Application filed June 29, 1922. Serial No. 571,753.

*To all whom it may concern:*

Be it known that I, WILLIAM W. LEISTER, a citizen of the United States, residing in the borough of Quakertown, in the county of Bucks and State of Pennsylvania, have invented certain Improvements in a Combined Cane and Stool, of which the following is a specification.

My improvements are designed to provide a simple and compact structure which when expanded will provide a stable and comfortable seat and may be so manipulated and contracted as to form a readily transportable cane or walking stick. In its preferred form it comprises a plurality of pairs of semicylindrical legs, the legs of each pair being pivotally connected together intermediate their lengths and having connected therewith rods or struts by which the two pairs of legs may be secured together in parallel planes to form a stool frame, on which a fabric seat may be readily secured. The legs are movable about their respective pivotal axes into parallel relation, thereby forming hollow tubular cane sections, which may be connected together to form a cane, the legs being prevented from spreading by suitable collar members at the ends and covering the joint between the tube sections. The connecting struts are preferably pivoted to the leg members so that each tube section has enclosed therein a strut pivoted thereto and telescoped therein a strut pivoted to the other section, thereby reinforcing the joint between the tube sections.

In the accompanying drawings, Fig. 1 is an elevation of a device embodying my improvements assembled to form a cane or walking stick; Fig. 2 is an irregular longitudinal sectional view of the same; Fig. 3 is an elevation of the upper section of the cane with the members thereof spread to form legs; Fig. 4 is an elevation of the lower section of the cane with the members thereof spread to form legs; Fig. 5 is a fragmentary detail view of the pivot joint between a leg and strut; Fig. 6 is a fragmentary detail view of the detachable connection between a leg and strut; and Fig. 7 is a perspective view of the device assembled to form a stool.

As illustrated in the drawings, the device comprises a pair of semi-cylindrical members 1 and 2 having secured therein bearing blocks 3 and 4, the parts being pivotally connected by the pintle 5 so that the leg members may be moved into parallel relation to form a tubular cane section. A second pair of semi-cylindrical members 6 and 7 have secured therein bearing blocks 8 and 9, and are pivotally connected together by the pintle 10 so that the leg members may be moved into parallel relation to form a second tubular cane section.

The cane sections are provided with the respective screw threads 1' and 6' for the engagement of the correspondingly threaded collar 11 by which the sections are secured together, and are also provided with the respective screw threads 2' and 7' for the engagement of the threaded handle 12 and ferrule 13.

The leg 1 has pivotally connected with one end thereof a rod 14, provided with a tenon 14', and has pivotally connected with the other end thereof a bar 15, provided with the tenon 15' and adapted to form a seat support. The leg 6 has pivotally connected with an end thereof a rod 16, provided with a tenon 16', and has pivotally connected with the other end thereof a bar 17, provided with the tenon 17'. The bar 17 has fixed thereto a sheet of fabric 18 having secured to its free end a rod or wire 19.

To form a stool, the parts are assembled as illustrated in Fig. 7, the pairs of legs being spread and disposed in parallel planes, where they are secured to form a frame by the engagement of the tenons 14' and 16' in the sockets 20 and 21 in the legs 7 and 2, the opening 21 being normally closed by a spring pressed plug 22 and the opening 20 being covered by the ferrule 13 when the device is used as a cane. The tenon 17' of the seat supporting bar 17 is engaged in the slot 23 of the leg 2 and the tenon 15' of the seat supporting bar 15 is engaged in the slot 24 of the leg 7, so that the seat 18 can be spread over such supports and held in place by the engagement of the rod 19 in the eye 25 in the leg 7 and the slot 26 in the leg 1.

When the device is to be transported, the cross bars and rods are disengaged from their sockets. The rods 14 and 16 are folded within the respective legs to which they are connected, and the legs of the respective pairs turned on their axes to form tubular cane sections. The seat 18 is rolled up on the rod 19 so as to lie close to the bar 17. The bars 15 and 17 are then passed through the collar 11 and telescoped within the respective lower and upper cane sections, which are securely fixed together by screwing the collar 11 thereon. The handle 12 and ferrule 13 are then screwed on the shaft to complete the cane.

While I have described in detail the structure herein illustrated, it is to be understood that I do not thereby limit my invention to the precise features of construction shown, as I am aware that many mechanical changes and modifications may be made therein without departing from the spirit and scope of this invention as set forth in the claims hereto appended.

Having described my invention, I claim:

1. A device of the character described comprising a plurality of pairs of pivotally connected legs, the legs of the respective pairs being movable into parallel relation to form tube sections, means for detachably connecting said tube sections in abutting relation, a member connected with each of said tube sections and telescoping within the other tube section when said tube sections are connected, and a seat supported by said members.

2. A device of the character described comprising a plurality of pairs of pivotally connected legs, the legs of each pair being movable into parallel relation to form a tube section, a collar for engaging said tube sections in abutting relation, members pivotally connected with each of said tube sections, means for engaging the pivoted members of each section with the legs of the other section, and a seat supported by members aforesaid, each of said last named members telescoping within the tube section to which it is not pivoted when said tube sections are engaged in abutting relation.

In testimony whereof I have hereunto set my name this twenty-first day of June, A. D. 1922.

WILLIAM W. LEISTER.